Aug. 27, 1957     E. O. WINTER     2,803,916
FISH LURE
Filed July 11, 1955
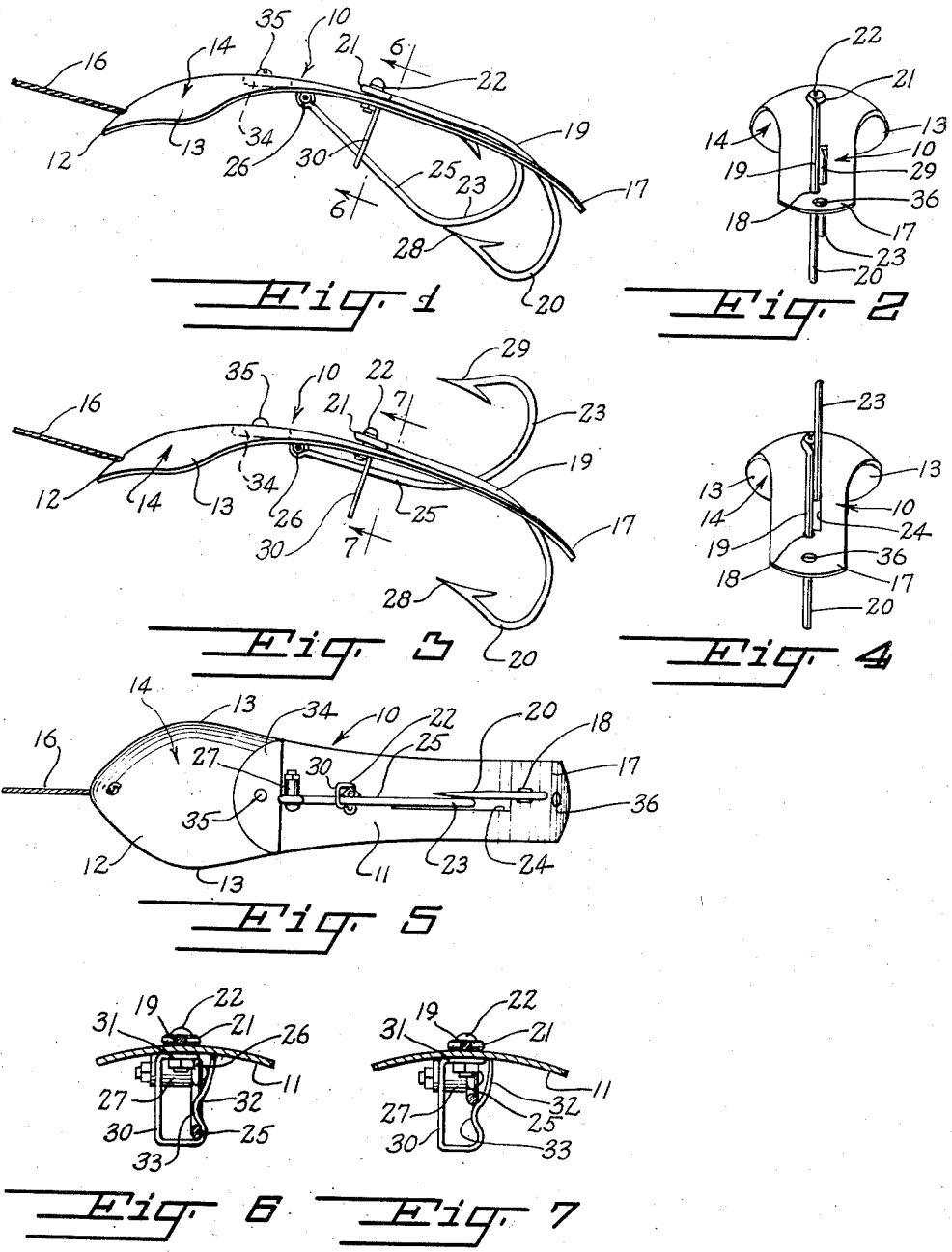
INVENTOR.
Emil Otto Winter
BY
Christian R. Nielsen
Attorney

United States Patent Office 2,803,916
Patented Aug. 27, 1957

2,803,916

FISH LURE

Emil O. Winter, Milwaukee, Wis.

Application July 11, 1955, Serial No. 521,081

1 Claim. (Cl. 43—42.41)

This application is a continuation in part of my pending application, Serial No. 326,847, filed December 19, 1952, and now abandoned.

This invention relates to a fishing lure of the so-called "weedless" type and which has a motion when drawn through the water simulating a swimming object.

It is one object of the invention to provide a weedless fish lure which has a side-to-side motion but does not rotate and therefore simulates a live bait and which moves at substantially a constant depth when the lure is drawn through the water.

Another object of the invention is to provide a spoon-type lure having a fixed hook and a movable hook and in which the points of the hooks are guarded against catching on seaweed and the like and are so mounted as to provide ample clearance for bait or a rotatable spinner and without interference with the action of the movable hook.

Another object of the invention is to provide a spoon-type of fishing lure which has a side-to-side motion as a whole and to which a spinner may be attached at the rearward end to obtain a complex motion of the spinner resulting from side-to-side motion, movements of the lure as a whole upon impact with weeds or the like, and rotation of the spinner.

Another object of the invention is to provide a spoon-type fish lure in which the hooks extend downwardly from the body or spoon of the lure and on substantially the center line thereof for stabilizing movements of the lure, whereby lesser movement is obtained at the forward end of the lure than the rearward end thereof, when the lure is drawn through the water.

Another object of the invention is to provide a weedless spoon-type lure which moves through the water at an angle to the water surface which may be controlled, and which requires only slight change in direction of approach of a fish about to strike.

Another object of the invention is to provide a spoon-type fish lure in which a fixed hook and a movable hook project downwardly from the body or spoon of the lure when in use, with the barbs continuously in substantially vertical position when the lure is drawn through the water and in which the movable hook moves upwardly through the body of the lure when the lure is struck by a fish.

Another object of the invention is to provide a spoon-type lure with adjustable weights which do not affect the general type of movement of the lure through the water and whereby the lure can be quickly adjusted for use in trolling or casting and with either a spinning reel or a casting reel.

Another object of the invention is to provide a spoon-type lure having a fixed hook and a movable hook, the movable hook being so set and held as to be safe for handling and carrying in the fisherman's pocket or tackle box, except when pressure is applied on the movable hook at right angles to the general plane of the body of the lure.

Generally, the present invention provides a fish lure wherein a spoon body is employed for mounting of a fixed hook and a movable hook, the fixed hook being mounted upon the one side of the body with the hook portion passing through a slot formed longitudinally in the rear portion of the body, while the movable hook is pivoted on the other side of the body, with the hook portion thereof passing also through the slot in the spoon body. The point of the fixed hook is guarded by contacting engagement with a portion of the shank of the movable hook and the point of the movable hook is guarded by the spoon body when the hooks are in "set" position. The major portion of both hooks extends downward from the spoon body when the hooks are set. A releasable spring exerts lateral pressure upon the movable hook for frictional engagement between the movable hook and a side wall of the longitudinal slot.

Additional objects, advantages and features of invention will be apparent from the following description considered in conjunction with the accompanying drawing, wherein Figure 1 is a side elevation of the lure constructed in accordance with the invention, the hooks being shown in "set" position;

Figure 2 is a rear elevation thereof;

Figure 3 is a view similar to Figure 1 with the hooks in "sprung" position;

Figure 4 is a rear elevation thereof;

Figure 5 is a bottom plan view of Figure 3;

Figure 6 is a cross-section on the line 6—6 of Figure 1; and

Figure 7 is a cross-section on the line 7—7 of Figure 3.

The drawings illustrate a spoon-type fishing lure generally indicated by the reference character 10 which comprises an elongated body 11 having a slight arcuate curvature in its longitudinal plane, and greater curvature in its transverse plane for a minor portion of its length, the forward end 12 of the body being outwardly flared along its sides, and curved toward one side of the body as at 13 to form a spoon 14. The forward end 12 is formed with an aperture 15 for securing a fishing line 16 on the longitudinal axis of the body. The forward portion of the lure body is bulbous and tapers to a substantially rectangular rearward portion of only approximately two-thirds of the transverse width of the forward portion. When the lure 10 is drawn through the water by means of the line 16, the lure has a side-to-side motion due to pressure of water on the transverse and longitudinal curvatures of the lure body as well as to pressure of water upon the outwardly and sidewardly flared end 12 of the body. The tail portion 17 however has a faster movement than the forward portion 12, which produces a "wriggling" action simulating the movements of a live bait.

An opening 18 is formed through the body toward the rear end 17 thereof for passage of the shank 19 of a hook 20. The shank 19 includes an eyelet 21 for registry with an opening in the lure body to receive fastening means 22 such as a bolt and nut to maintain the hook rigid with the lure. It will be noted that the opening 18 is slightly offset to one side of the longitudinal axis of the lure.

A hook 23 cooperates with the fixed hook 20 and is movable through the lure body in an elongated slot 24 offset from the longitudinal axis of the lure, for a purpose to be explained. The shank 25 of the hook 23 includes an eyelet 26 which is disposed in a vertical plane as seen in Figures 1, 2, 6 and 7 and is pivotally mounted in a bearing 27 secured upon a side of the lure body. The bearing 27 is offset from the longitudinal axis of the lure body so that the shank 25 of the hook 23 lies substantially in the longitudinal axis of the lure, by virtue of which the shank 25 will have a light frictional contact with one edge wall of the offset slot 24.

In the "set" position of the hooks 20 and 23, as shown in Figure 1, the pointed end 28 of the fixed hook 20 is in contacting relation with and is guarded by the shank 25 of the hook 23, while the pointed end 29 of the movable hook 23 lies within the boundary of the slot 24 and is guarded by the lure body. Thus liability of the hooks engaging seaweed, grass and the like is avoided.

To provide a spring action for exerting a lateral pressure upon the movable hook 23, a spring loop 30 is employed having an eyelet 31 at one end engaged by the fastening means 22, the leg 32 thereof being free and bearing on the shank 25 of the movable hook 23. The free leg 32 of the loop 30 is formed with an arcuate inward bend 33 intermediate the length thereof and lies in the path of movement of the shank 25 of the hook 23, the free end of the spring being substantially straight and at an angle to the chord of of the spring bend 33. In the position of the shank 25 shown in Figure 6, the bend 33 will retain the point 29 of the hook 23 within boundaries of the slot 24, but when the lure is struck, the shank 25 presses on the bend 33 in its movement through the slot 24 and causes the free leg 32 of the loop to be flexed laterally to the position shown in Figure 7, which brings the movable hook entirely clear of the fixed hook.

The length of hook 23 is such that interchangeable, different sized weights 34, may be secured to the body member 11, by means of a small screw 35, ahead of the bearing 27, without change in the side-to-side motion or substantial change in the angle at which the lure moves through the water. Thus, the lure can be readily adapted for use in casting or trolling and with any type of reel. The lure moves through the water at an angle to the water surface and at a constant depth dependent in part on the size of the weights 34. The weights 34 are readily interchangeable and may be of different colors to attract fish and as an additional attraction, a conventional spinner may be secured to an aperture 36 in the tail portion 17 to secure rotating movement of the spinner in addition to the side-to-side movement of the entire lure; the movements of the lure caused by contact with weeds and the like or by the action thereon of water currents, and the rotation of the spinner, produce a complex and erratic movement differing from the usual movement of a spinner and which has proven especially attractive to fish.

In use, the moveable hook 23 is moved to its "sprung" position as shown in Figure 3, enabling the hook 20 to be baited, or to have a spinner attached thereto, after which the hook 23 is moved to its set position as shown in Figure 1. As best seen in Figure 1, the fixed hook 19 occupies a position rearwardly of the movable hook so that any bait or spinner attached to the fixed hook 19 will not interfere with releasing movement of the movable hook. The lure will travel in the water in horizontal direction at a contant depth and at an angle of approximately 45 degrees with both hooks extending below the lure for preventing rotation of the body and stabilizing the lure against impact by weeds, water currents and the like. When a strike is had, the fish approaches so that its lower jaw will move at right angles to the movable hook which then passes through the slot 24 to its sprung position.

The present lure has been found safe for use by experienced and inexperienced fishermen regardless of how the lure was handled or carried and has not been damaged by use under the most adverse circumstances. The lure has been very successful in catching fish by more than fifty persons, in either clear or weedy water and with or without bait or a spinner. It is believed that the success of the lure is due to its side-to-side motion while the lure body as a whole remains in position with the hooks always extending downwardly. The movement of the lure is affected only slightly by contact with weeds or by water currents and thus maintains a uniformity of motion expected from a live bait or from free swimming objects. The side-to-side motion of the lure as a whole is greater at the rearward end which produces a substantially horizontal wriggling action and such movement can be enhanced by the use of a spinner attached to the lure rear end. The lure moves through the water at an angle to the water surface which is readily controlled. The hooks are always in the preferred position for catching a striking fish and the movable hook always acts upwardly toward the relatively stationary upward jaw of the fish. The barbs of the hook are widely offset lengthwise of the lure but are so guarded that the lure has been successfully used in weedy water not heretofore considered suitable fishing ground.

While I have shown and described a preferred form of the lure, this is by way of illustration only, and I consider as my own, all such modifications in construction as fairly fall within the scope of the appended claim.

I claim:

In a spoon-type fish lure, an elongated body member having arcuate transverse curvatures in its longitudinal and transverse planes and having a forward end, the side portions of which are downwardly and outwardly flared, a barbed hook fixed to the upper side of said body member, said body member having an opening positioned inwardly of the rear end thereof for passage of the shank of the hook to present the barbed portion of the hook at the underside of the body member, said body member further having a longitudinally extended slot laterally offset from the longitudinal axis of the body member, a barbed hook pivotally mounted upon the underside of the body member and movable between and into respective set and sprung positions, said hook having frictional contacting engagement with a wall of said slot for maintaining the barbed portion of the hook beneath the upper boundary of said slot, and said fixed hook having a shank of a length to position the bight thereof rearwardly of the pivotally mounted hook, the barbed end of the fixed hook having contacting engagement with a portion of the shank of the pivotally mounted hook when said hooks are in set position, a spring tensioned loop having a movable leg on the underside of said body member, said leg embracing the shank of the pivotally mounted hook, and said leg having an arcuate inward bend for contacting engagement of the shank of the pivotally mounted hook, whereby said pivotally mounted hook imparts lateral movement to said leg when moved into set and sprung positions.

References Cited in the file of this patent

UNITED STATES PATENTS

| | | |
|---|---|---|
| 478,864 | Hunter | July 12, 1892 |
| 627,344 | Maroney | June 20, 1899 |
| 872,817 | Hipp | Dec. 3, 1907 |
| 1,348,670 | Viehweger | Aug. 3, 1920 |
| 1,464,215 | Olson | Aug. 7, 1923 |
| 1,575,139 | Wiesenfeld | Mar. 2, 1926 |
| 1,752,088 | Huntington | Mar. 25, 1930 |
| 2,069,724 | Pflueger | Feb. 2, 1937 |
| 2,392,677 | Lauby | Jan. 8, 1946 |
| 2,395,641 | Peterson | Feb. 26, 1946 |